(12) United States Patent
Prost et al.

(10) Patent No.: US 8,836,325 B2
(45) Date of Patent: Sep. 16, 2014

(54) VALVE POSITION SENSOR

(75) Inventors: Jerome Prost, Houston, TX (US); Bernard Juchereau, Voisins-le-Bretonneux (FR); Jean-Luc Garcia, Courcouronnes (FR); Fabien Cens, Massy (FR); Anthony Veneruso, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 417 days.

(21) Appl. No.: 12/922,793

(22) PCT Filed: Mar. 18, 2009

(86) PCT No.: PCT/IB2009/000557
§ 371 (c)(1), (2), (4) Date: Dec. 9, 2010

(87) PCT Pub. No.: WO2009/115907
PCT Pub. Date: Sep. 24, 2009

(65) Prior Publication Data
US 2011/0260715 A1 Oct. 27, 2011

(30) Foreign Application Priority Data
Mar. 20, 2008 (EP) .................................. 08102802

(51) Int. Cl.
*G01V 3/18* (2006.01)
*G01B 7/14* (2006.01)
*F15B 15/28* (2006.01)
*G01D 5/04* (2006.01)
*F15B 13/04* (2006.01)
*G01D 5/12* (2006.01)

(52) U.S. Cl.
CPC .............. *G01D 5/04* (2013.01); *F15B 15/2807* (2013.01); *F15B 13/0402* (2013.01); *G01D 5/12* (2013.01)
USPC ...................................... 324/207.21; 324/355

(58) Field of Classification Search
CPC .............................. G01V 3/30; E21B 47/0905
USPC .............................................. 324/207.21, 355
See application file for complete search history.

(56) References Cited

U.S. PATENT DOCUMENTS 5,041,784 A * 8/1991 Griebeler ................. 324/207.21

FOREIGN PATENT DOCUMENTS

| DE | 2427049 | 12/1975 |
| DE | 3420189 | 3/1985 |
| DE | 3836080 | 4/1990 |

* cited by examiner

*Primary Examiner* — Reena Aurora
(74) *Attorney, Agent, or Firm* — Cameron R. Sneddon

(57) ABSTRACT

A valve position sensor of a sliding sleeve of a flow control valve comprising a sleeve displacement converting means for converting a sleeve displacement into a radial displacement, and a measuring means for detecting the radial displacement and correlating the radial displacement to the position of the sliding sleeve within the flow control valve.

17 Claims, 5 Drawing Sheets

VALVE POSITION SENSOR

FIELD

The disclosure relates to a valve position sensor for a sliding sleeve of a flow control valve. The disclosure finds a particular application in downhole production equipment in the oilfield industry.

BACKGROUND

Uncontrolled production of a hydrocarbon reservoir may result in a coning effect, meaning that a producing zone of the reservoir starts producing water. Water mobility into a geological formation is higher than oil mobility. As a consequence, once the production of water has started it is extremely difficult to recover most of the oil still in the producing zone of the reservoir. Thus, improving oil recovery from a hydrocarbon reservoir requires the implementation of a proper reservoir management. Downhole equipments are used to control the production rate of at least one producing zone PZ of a reservoir GF into a cased well bore WB and/or production tubing PT towards the surface ST as depicted in FIG. 1. Further, downhole equipments are also used to shut off or limit the production of a zone if it produces water in multi producing zones situation. Typically, such downhole equipments comprise downhole flow control valves FCV that are able to lower or stop the production rate of a producing zone. A flow control valve can be either a two-position valve or a multi-position valve. A two-position valve can be full open or full close. A multi-position valve has intermediate positions such as to control the flowing rate from a full open state to a full close state. Generally, the flow control valve is coupled to sensors giving measurements of, for example, pressures, temperatures and types of fluid flowing out of the producing zones. These measurements are transmitted to equipments and operators at the surface ST.

Typically, a flow control valve is based on the principle of a sliding sleeve covering or uncovering a series of holes of the production tubing. The position of the sleeve is adjusted in order to open or close, entirely or not, the flow control valve. Generally, the flow control valve is hydraulically controlled. The displacement of the sliding sleeve is realized thanks to double effect piston with hydraulic pressure coming from the surface. The sliding sleeve is operated upward or downward, depending on the target position to reach. In order to know at any time the position of the downhole valve, a valve position sensor is necessary because the hydraulic control of the valve as above described does not offer a direct feedback of the downhole valve position. Document WO 2007/102821 describes a well tool having a magnetically coupled position sensor. In operation of the well tool, relative displacement is produced between members of the well tool. A magnetically coupled position sensor includes one magnet assembly attached to a member for displacement therewith and another magnet assembly movably attached to the other member and magnetically coupled to the first magnet assembly for displacement therewith. The position sensor further includes a magnetically permeable material which increases a magnetic flux density between the magnet assemblies. The magnetically permeable material may be positioned between magnets of the magnet assemblies and/or spaced apart therefrom.

Implementing such a position sensor inside a flow control valve is difficult because it requires a sensor of a compact size, easy to package and also protected from the harsh downhole oil and gas environment. Further, a position sensor having a compact size is not adapted to the long stroke of the sliding sleeve of the flow control valve.

SUMMARY

It is an object of the disclosure to propose a valve position sensor that overcomes at least one of the drawbacks of the prior art valve position sensor.

According to an aspect of the disclosure, the valve position sensor comprises a sleeve displacement converting means for converting a sleeve displacement into a radial displacement, and a measuring means for detecting the radial displacement and correlating the radial displacement to the position of the sliding sleeve within the flow control valve.

According to another aspect of the disclosure, a method for determining a position of a sliding sleeve of a flow control valve includes, converting a sleeve displacement into a radial displacement, detecting the radial displacement, and correlating the radial displacement to the position of the sliding sleeve within the flow control valve. This disclosure enables determination of the sleeve position by absolute or differential measurement.

These and other aspects of the disclosure will be apparent from and elucidated with reference to the embodiments described hereinafter.

BRIEF DESCRIPTION OF THE DRAWINGS

The present disclosure is illustrated by way of example and not limited to the accompanying figures, in which like references indicate similar elements.

DETAILED DESCRIPTION

Figure 1:
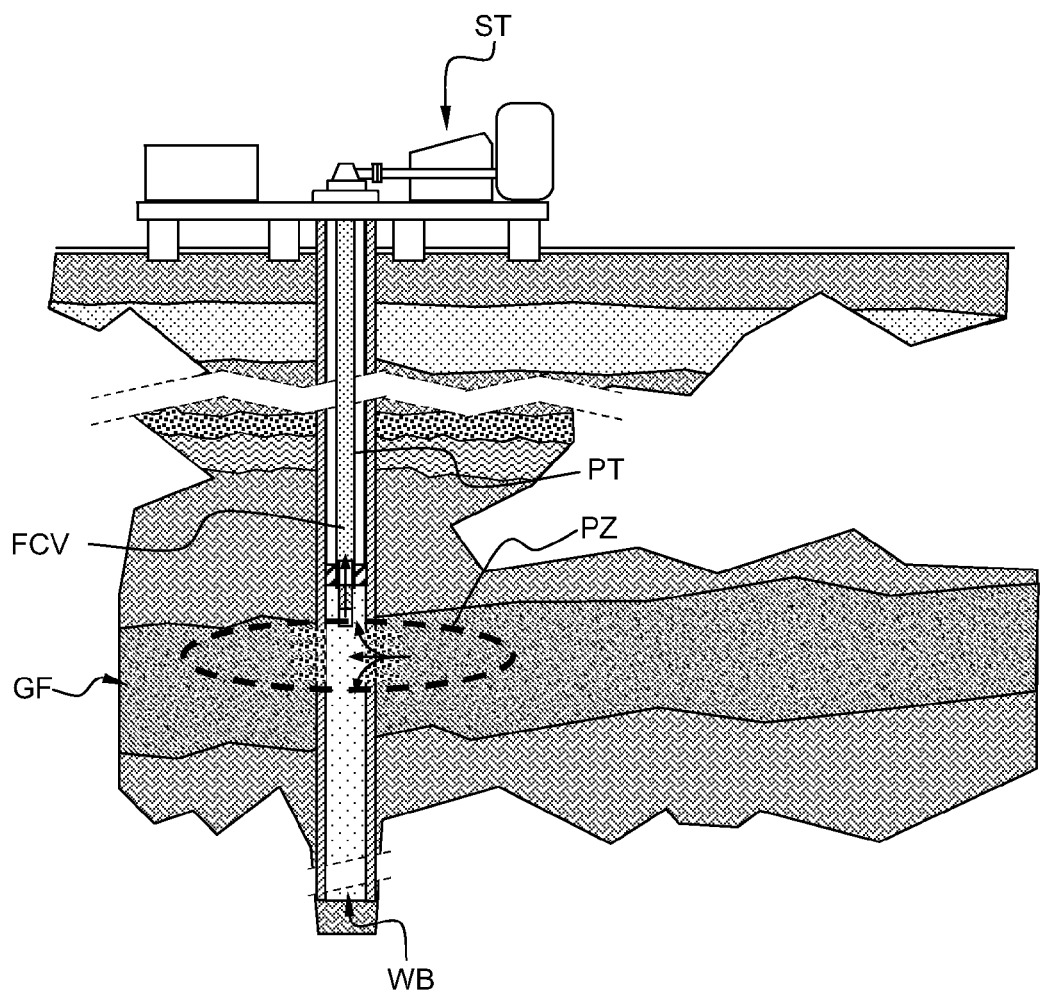
FIG. 1 schematically shows a typical onshore hydrocarbon well location and a flow control arrangement.
Figure 2:
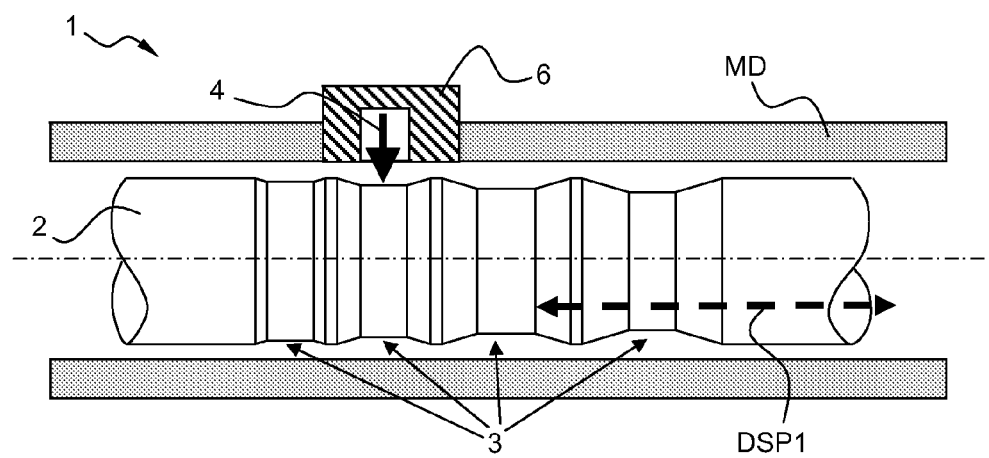
FIGS. 2 and 3 are detailed views schematically showing a valve position sensor according to a first embodiment of the disclosure.
Figure 3:
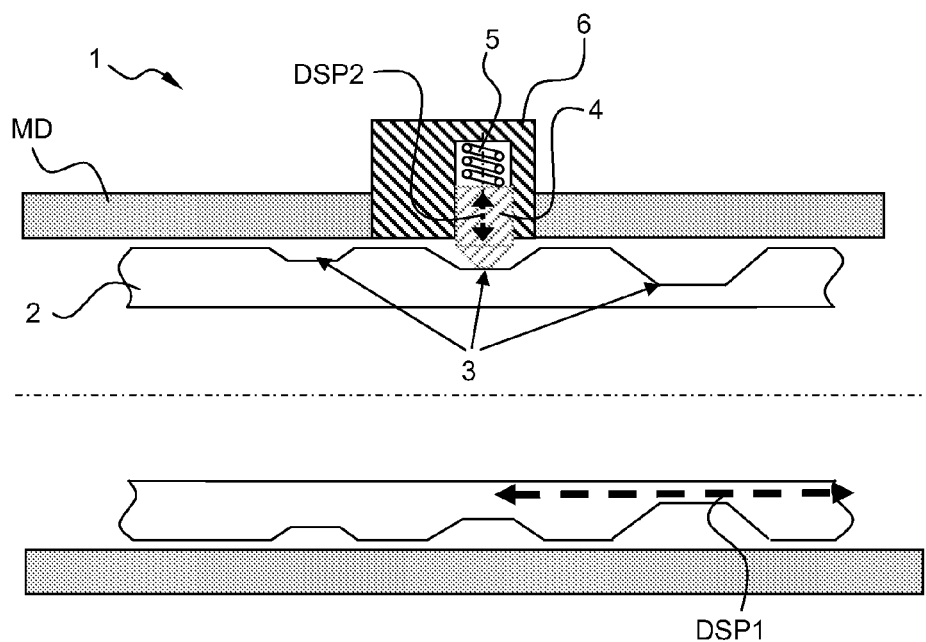

FIGS. 2 and 3 are detailed views schematically showing a valve position sensor 1 according to a first embodiment of the disclosure. FIG. 2 illustrates the principle of the disclosure. The first embodiment of the disclosure is adapted to a sliding sleeve 2 effecting a translation displacement DSP1 within the mandrel MD of a flow control valve FCV (shown in FIG. 1). The goal of the valve position sensor 1 is to measure the position of the sliding sleeve 2 within the mandrel MD. The principle of the valve position sensor of the disclosure is to relate the long stroke displacement of the sleeve DSP1 (e.g. more than 25 cm or approximately 10 in) to a short stroke radial displacement DSP2 of a detecting device 4 (e.g. a few millimeters). Thus, the valve position sensor of the disclosure does not measure directly the position of the sliding sleeve.

The valve position sensor 1 comprises a sleeve displacement converting means for converting the sleeve displacement DSP1 into the radial displacement DSP2. The sleeve displacement converting means comprises at least one characteristic element positioned on the sliding sleeve 2 circumference. Each characteristic element corresponds to a determined position of the sliding sleeve 2. In the first embodiment depicted in FIGS. 2 and 3, the characteristic elements are grooves 3. Each groove is characterized by a determined depth associated to a determined position of the sliding sleeve 2. The sleeve displacement converting means further comprises a characteristic element detecting device 4. In the first embodiment depicted in FIGS. 2 and 3, the characteristic element detecting device is a plunger 4. The sleeve displacement converting means may further comprise a contacting means for maintaining the plunger in contact with the sliding sleeve. For example, the contacting means is a spring mechanism 5. Alternatively, the spring mechanism 5 may be replaced by an appropriate resilient material. Thus, the plunger moves such as to follow the external shape of the sliding sleeve. As a consequence, the valve position sensor enables transforming the long stroke of the sliding sleeve into a short stroke of the plunger. Advantageously, the spring mechanism 5 and a first end of the plunger 4 are contained within a housing 6. In particular, the plunger 4 may slide inside the housing 6. As an alternative (not shown), an O-ring seal may be provided in order to isolate the cavity defined within the housing from the fluid of the outside environment. Due to the action of the spring 5, a second end of the plunger 4 is maintained into contact with the circumference of the sliding sleeve 2. The housing 6 may be integrated into the mandrel MD of the flow control valve FCV. The determination of the plunger position will be explained in details hereinafter in relation with the description of FIGS. 7 to 10.

As a first alternative to the first embodiment (not shown), the characteristic elements may be steps. Each step is characterized by a determined height associated to a determined position of the sliding sleeve. The characteristic element detecting device may also be a plunger.

As a second alternative to the first embodiment (not shown), the characteristic element may be at least one slope. The position of the characteristic element detecting device along the slope is correlated to a determined position of the sliding sleeve. The characteristic element detecting device may also be a plunger. Theoretically, with at least one slope, every sleeve position is associated with a unique plunger height.

The first embodiment and the first alternative may be used where a limited number of positions of the sleeve are required. The second alternative to the first embodiment is used where a greater number of positions of the sleeve are required, the number being limited by the plunger displacement measuring error.

Figure 4:
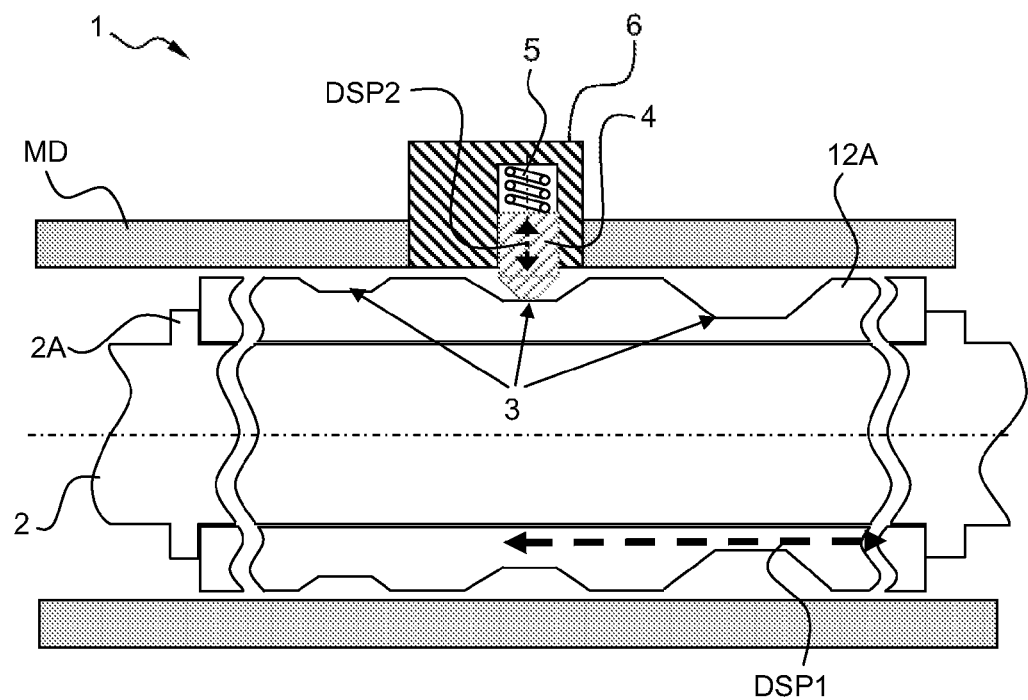
FIGS. 4 and 5 are detailed views schematically showing a valve position sensor according to a third and fourth alternative of the first embodiment of the disclosure, respectively.
Figure 5:
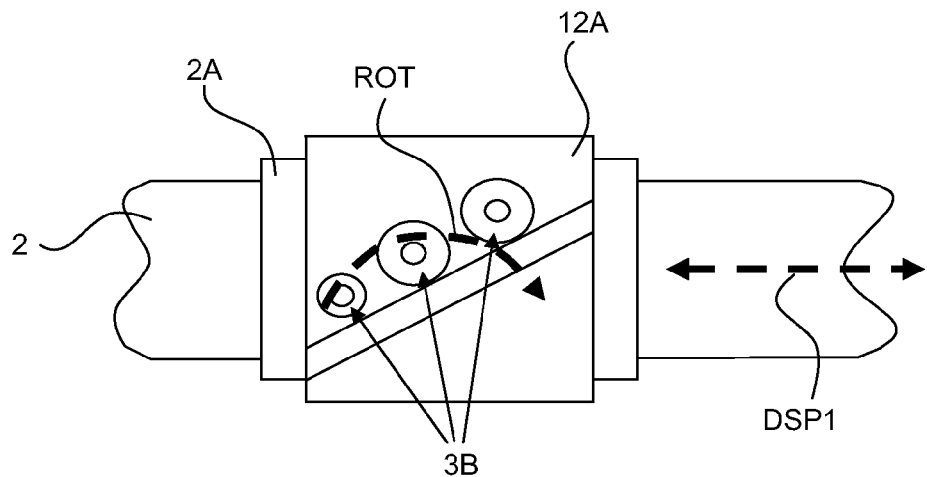

FIGS. 4 and 5 are detailed views schematically showing a valve position sensor according to a third and fourth alternative of the first embodiment of the disclosure, respectively. The third and fourth alternative comprises at least one intermediate part 12A providing an interface between the sliding sleeve 2 and the characteristic element detecting device 4. The intermediate part 12A comprises the characteristic elements, for example the grooves 3, to be detected. The characteristic element detecting device 4 contacts the characteristic elements 3 and detects the position of the sliding sleeve through the detection of the characteristic elements.

According to the third alternative shown in FIG. 4, the intermediate part 12A is constrained with the sliding sleeve 2. For example, the intermediate part 12A is constrained with the sliding sleeve 2 by means of shoulder 2A of the sleeve on both side of the intermediate part 12A. Thus, the sliding sleeve 2 imposes the translation displacement DSP1 to the intermediate part 12A. The intermediate part 12A has the same displacement DSP1 as the sliding sleeve 2.

According to the fourth alternative shown in FIG. 5, the intermediate part 12A is partially constrained with the sliding sleeve 2. The sliding sleeve 2 imposes the translation displacement DSP1 to the intermediate part 12A. In addition, the intermediate part 12A is also free to rotate by means of an indexing mechanism 3B. Thus, an additional rotation displacement ROT is added to the imposed translation displacement DSP1. The intermediate part 12A has not the same displacement DSP1 as the sliding sleeve 2.

Figure 6:
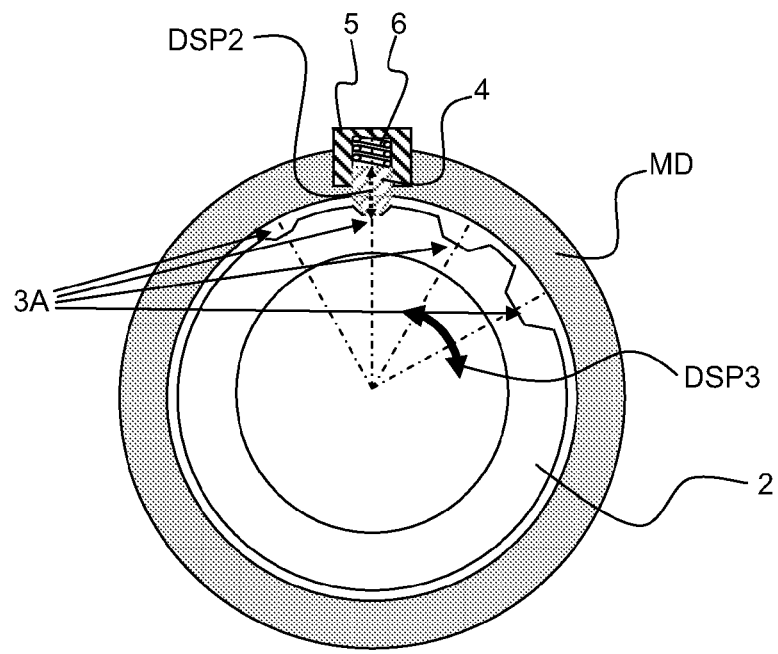
FIG. 6 is a detailed view schematically showing a valve position sensor according to a second embodiment of the disclosure.

FIG. 6 is a detailed view schematically showing a valve position sensor according to a second embodiment of the disclosure. The second embodiment of the disclosure is adapted to a sliding sleeve 2 effecting a rotation displacement DSP3 or a combination of a rotation and a translation displacement (not shown) within the mandrel MD of a flow control valve FCV (shown in FIG. 1).

Principle and architecture similar to the first embodiment may be used to measure the position of the sleeve. The grooves enable measuring the axial position of the sleeve even when turning. Thus, the valve position sensor does not require a proper orientation of the sleeve or any anti-rotation device. Furthermore, slots 3A machined along the sleeve enable measuring the radial position of the sleeve even when turning. Each slot is characterized by a determined depth associated to a determined position of the sliding sleeve 2. Alternatively, the slots may be replaced by flats (not shown). Each flat is characterized by a determined height associated to a determined position of the sliding sleeve 2.

Figure 7:
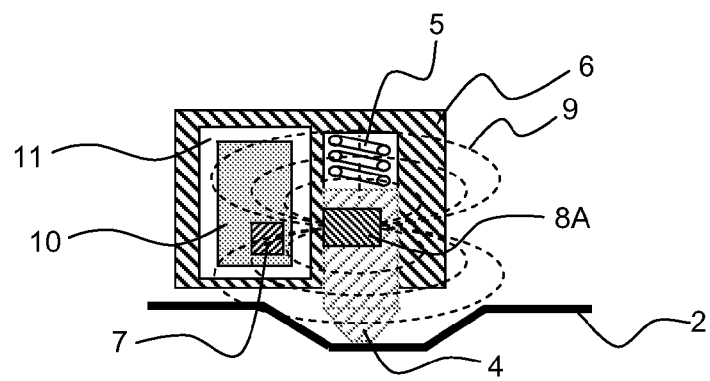
FIGS. 7 and 8 are detailed views schematically showing a sleeve displacement converting means and a measuring means according to a first and second implementation, respectively.
Figure 8:
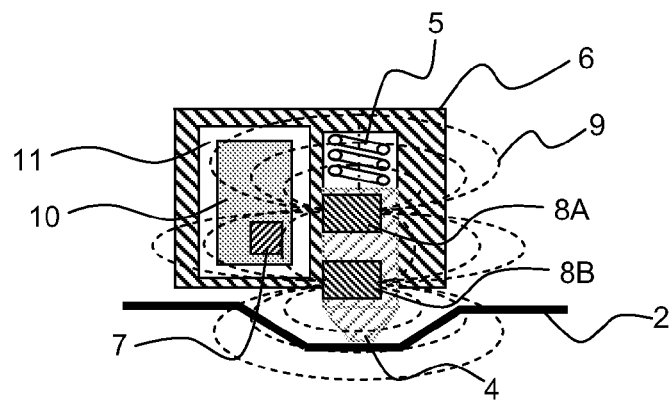

FIGS. 7 and 8 are detailed views schematically showing a sleeve displacement converting means and a measuring means according to a first and second implementation, respectively.

The valve position sensor further comprises measuring means for detecting the radial displacement DSP2 of the plunger 4 and correlating the radial displacement to the position of the sliding sleeve 2 within the mandrel MD of the flow control valve FCV.

Advantageously, the means for detecting the radial displacement comprises an electromagnetic measuring device, for example an anisotropic magneto resistive sensor 7. The anisotropic magneto resistive sensor enables determining the position or displacement of the plunger using non-contact electromagnetic techniques in a reliable manner.

According to a first implementation depicted in FIG. 7, the plunger 4 comprises a first magnet 8A.

According to a second implementation depicted in FIG. 8, the plunger 4 additionally comprises a second magnet 8B. The second implementation enables increasing the range of measurement, the signal sensitivity and the electromagnetic measuring device performances compared to the first implementation.

The anisotropic magneto resistive sensor 7 is integrated in an electronic circuit 10. The electronic circuit 10 may further comprise a memory, a processor and a data transmitting device (not shown). The plunger 4 displacement DSP2 is determined thanks to magneto-resistive measurements performed by the anisotropic magneto resistive sensor 7 and which are further correlated by the electronic circuit 10 to sleeve 2 position. More precisely, the output signal OS (see FIG. 9) of the anisotropic magneto resistive sensor 7 depends on the magnetic field lines 9 applied on the sensor 7. In particular, the output signal depends on the angle between the magnetic field lines 9 created by the magnet 8A, 8B of the plunger 4 and the sensor 7. Thus, the output signal depends on the relative position of the magnet of the plunger and the sensor. The output signal value is associated to a height of the plunger and then to the position of the sleeve according to a calibration performed after manufacturing of the flow control valve.

Advantageously, the anisotropic magneto resistive sensor 7 is located close to the magnet 8A, 8B of the plunger 4. The electronic circuit 10 is positioned into the housing 6, advantageously in a separate sealed cavity 11. Thus, the anisotropic magneto resistive sensor 7 and the electronic circuit 10 are protected from the fluid and pressure of the surrounding environment.

Figure 9:
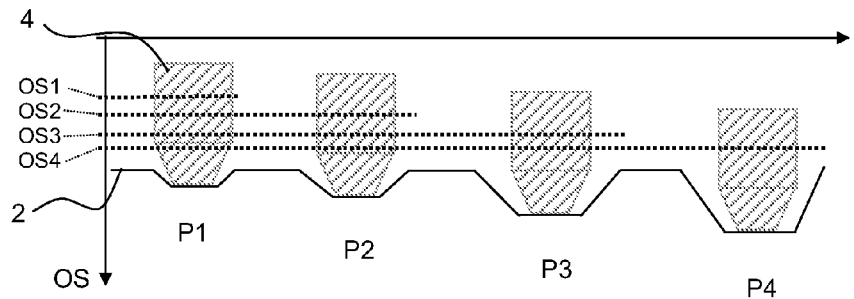
FIG. 9 illustrates the operation of the valve position sensor of the disclosure as an absolute position detection of the sliding sleeve of the flow control valve.

FIG. 9 illustrates the operation of the valve position sensor of the disclosure as an absolute position detection of the sliding sleeve of the flow control valve. The determination of the flow control valve position is based on the anisotropic magneto resistive sensor 7 output signal OS. Each individual plunger position (height) is associated to one sliding sleeve position within the mandrel of the flow control valve. As an example, FIG. 9 shows the relationship between the output signals OS1, OS2, OS3 and OS4 and a first P1, second P2, third P3 and fourth P4 position of the sleeve. The electronic circuit receives the value output signal OS from the anisotropic magneto resistive sensor 7 and relates said value with a sleeve position, according to calibration values. The calibration is performed during the assembly of the flow control valve of the disclosure. The absolute detection method is simple. Though, the absolute detection method is sensitive to a potential drift with time of the valve position sensor and offset of the anisotropic magneto resistive sensor. Indeed, thus The drift and offset may not be negligible because the stroke of the plunger between two consecutive position is small in comparison with the total stroke of the plunger.

Figure 10:
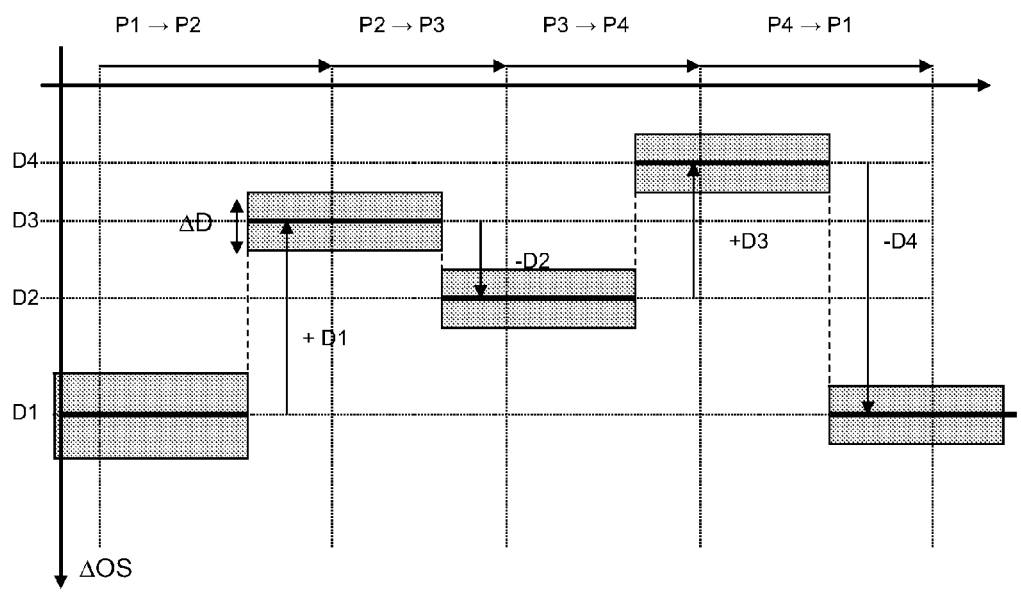
FIG. 10 illustrates the operation of the valve position sensor of the disclosure as a differential position detection of the sliding sleeve of the flow control valve.

FIG. 10 illustrates the operation of the valve position sensor of the disclosure as a differential position detection of the sliding sleeve of the flow control valve. The sleeve position is determined by the displacement of the plunger from one position to another position. The differential position detection enables overcoming the offset and drift errors $\Delta D$ of the absolute position detection method. The determination of the position of the sleeve is determined by the variation of the sensor output signal $\Delta OS$. As an example, FIG. 10 shows the variation of the amplitude of the output signal D1, D2, D3, D4 measured by a relative valve position sensor for a four positions P1, P2, P3 and P4 flow control valve. The sleeve is in a first position P1 and reaches a second position P2 such that a positive amplitude +D1 is measured (taking into account the margin of error $\Delta D$). Then, the sleeve moves from the second position P2 and reaches a third position P3 such that a negative amplitude –D2 is measured (taking into account the margin of error $\Delta D$). Subsequently, the sleeve moves from the third position P3 and reaches a fourth position P4 such that a positive amplitude +D3 is measured (taking into account the margin of error $\Delta D$). Finally, the sleeve moves from the fourth position P4 and reaches the first position P1 such that a negative amplitude –D4 is measured (taking into account the margin of error $\Delta D$). Thus, as the constant errors due to the sensor, namely offset and the drift, are the substantially the same for each position of the sleeve, the differential measurement between two positions allows having an accurate determination of the displacement of the plunger when traveling from one groove to another.

Though the disclosure has been described in relation with a particular application of the flow control valve to an onshore hydrocarbon well location, the disclosure may also apply to offshore hydrocarbon well locations. Further, the disclosure is not limited to oilfield application, as those versed in the art will recognize that the disclosure may apply in other applications where flow control valve may be used, for example in a water well.

The number of grooves, steps, flats, and/or positions presented in the drawings and their description is only illustrative, as those versed in the art will recognize that the disclosure may similarly apply to sleeves of flow control valves having other number of such grooves, steps, flats, and/or positions.

The drawings and their description hereinbefore illustrate rather than limit the disclosure.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A valve position sensor of a sliding sleeve of a flow control valve within a mandrel, comprising:
    a sliding sleeve displacement converting means for converting a sleeve displacement into a radial displacement, the sliding sleeve displacement converting means comprising:
        a plurality of grooves on the sliding sleeve outside circumference and a groove detecting device, each groove defining a determined depth associated with a determined position of the sliding sleeve, wherein the groove detecting device is configured to follow the exterior surface of the sliding sleeve; and
        a measuring means for detecting the radial displacement of the groove detecting device and correlating the radial displacement to the position of the sliding sleeve within the flow control valve, the measuring means comprising an electromagnetic measuring device.

2. The valve position sensor according to claim 1, wherein the grooves comprise steps or flats, each step or flat is associated with a respective position of the sleeve.

3. The valve position sensor according to claim 1, wherein the grooves comprise sloped surfaces, the position of the groove detecting device along the slope being correlated to a determined position of the sliding sleeve.

4. The valve position sensor according to claim 1, wherein the sleeve displacement converting means further comprises:
    at least one intermediate part providing an interface between the sliding sleeve and the groove detecting device, the intermediate part being at least partially constrained with the sliding sleeve.

5. The valve position sensor according to claim 1, wherein the groove detecting device is a plunger.

6. The valve position sensor of claim 5, wherein the sleeve displacement converting means further comprises a contacting means for maintaining the plunger in contact with the sliding sleeve.

7. The valve position sensor according to claim 6, wherein the contacting means is a spring mechanism.

8. The valve position sensor according to claim 1, wherein the groove detecting device comprises at least one magnet and the means for detecting the radial displacement comprises the electromagnetic measuring device.

9. The valve position sensor according to claim 8, wherein the electromagnetic measuring device comprises an anisotropic magneto resistive sensor.

10. A valve position sensor of a sliding sleeve of a flow control valve within a mandrel, comprising:
   a sliding sleeve displacement converting means for converting a sleeve displacement into a radial displacement, the sliding sleeve displacement converting means comprising:
   a groove detecting device;
   at least one intermediate part providing an interface between the sliding sleeve and the groove detecting device, the intermediate part being at least partially constrained with the sliding sleeve;
   a plurality of grooves on the outside circumference of at least one intermediate part, each groove defining a determined depth associated with a determined position of the sliding sleeve, wherein the groove detecting device is configured to follow the exterior surface of the intermediate part; and
   a measuring means for detecting the radial displacement of the groove detecting device and correlating the radial displacement to the position of the sliding sleeve within the flow control valve, the measuring means comprising an electromagnetic measuring device.

11. The valve position sensor according to claim 10, wherein the grooves comprise steps or flats, each step or flat is associated with a respective position of the sleeve.

12. The valve position sensor according to claim 10, wherein the grooves comprise sloped surfaces, the position of the groove detecting device along the slope being correlated to a determined position of the sliding sleeve.

13. The valve position sensor according to claim 10, wherein the groove detecting device is a plunger.

14. The valve position sensor of claim 13, wherein the sleeve displacement converting means further comprises a contacting means for maintaining the plunger in contact with the sliding sleeve.

15. The valve position sensor according to claim 14, wherein the contacting means is a spring mechanism.

16. The valve position sensor according to claim 10, wherein the groove detecting device comprises at least one magnet and the means for detecting the radial displacement comprises the electromagnetic measuring device.

17. The valve position sensor according to claim 16, wherein the electromagnetic measuring device comprises an anisotropic magneto resistive sensor.

* * * * *